United States Patent [19]

McKeen, Jr.

[11] 4,037,956

[45] July 26, 1977

[54] VERIFIED MAIL SYSTEM

[76] Inventor: Earl S. McKeen, Jr., 61 Jacobsen Drive, Norwood, Mass. 02062

[21] Appl. No.: 642,299

[22] Filed: Dec. 19, 1975

[51] Int. Cl.² .................. G03B 27/32; G03B 27/62; G01D 9/42

[52] U.S. Cl. .................................. 355/77; 346/22; 346/107 C; 355/75

[58] Field of Search ............. 346/107 C, 22; 354/106, 354/81, 88; 355/75, 77, 18, 133, 66

[56] References Cited

U.S. PATENT DOCUMENTS

| | | | |
|---|---|---|---|
| 2,787,190 | 4/1957 | McWhirter et al. | 346/22 UX |
| 3,042,920 | 7/1962 | Simjian | 346/107 C X |
| 3,065,467 | 11/1962 | Prevost | 346/107 C X |
| 3,417,681 | 12/1968 | Lemelson | 354/106 |
| 3,628,430 | 12/1971 | Morse | 355/66 X |
| 3,689,155 | 9/1972 | Nishiyama et al. | 346/107 C X |
| 3,709,597 | 1/1973 | La Rocca | 355/75 X |

*Primary Examiner*—Donald A. Griffin
*Attorney, Agent, or Firm*—William Nitkin

[57] ABSTRACT

Apparatus, means, and method for a verified mail system comprising copying devices for making copies of mail contents, a central depository for storage of the copied mail contents, a system for retrieval of copied mail contents and the reproduction of mail contents on an unalterable medium.

5 Claims, 4 Drawing Figures

VERIFIED MAIL SYSTEM

BACKGROUND OF THE INVENTION

1. Field of the Invention

This invention relates to the apparatus, means and method used for establishing a system of verified mail whereby an individual can obtain independent verification of the contents of mail sent by him to another party.

2. Description of the Prior Art

At present one can mail important letters by first class mail and, if a receipt is desired, by certified or registered mail. While the latter two give some indication in the form of a receipt that the envelope had been received, they give no proof of what was contained within the envelope. In many instances it is important for individuals and businesses to have an independent method of verification of the contents of mail sent by them. The need for independent verification of mail can arise in many instances as, for example, to prove the creation of a legal contract where acceptance is sent by mail. A verified mail system could also be of assistance in verifying that documents never received were in fact mailed. At present no satisfactory system of mail verification exists. The apparatus, means and method disclosed in this invention relate to the establishment and operation of a new class of mail service called Verified Mail that would not only provide independent verification of contents mailed but would also preserve the confidentiality of the materials sent, outlast the lives of witnesses of the contents mailed and be inexpensively and conveniently obtained.

SUMMARY

The present invention relates to the apparatus, means and method of establishing a new class of mail service called Verified Mail which would provide independent verification of the contents of a letter mailed.

At present there are approximately 31,000 various class postal stations throughout the United States and these stations all process their mail through their assigned sectional center. There are 540 sectional centers that serve as distribution centers for their outlying stations.

In one embodiment of this invention, sectional centers could serve as the processing centers for Verified Mail service for their affiliated outlying stations. Such a system would make Verified Mail service available to all. In this embodiment all microfilming or other means of reproduction of mail contents can be done at each sectional center. A person desiring to have his mail contents verified could go to a Verified Mail service window at his local post office. Upon payment of an appropriate fee, the postal customer hands over his mail contents to be verified. The postal employee then fills out a multipart receipt on which the postal customer places his signature, his address, telephone number, Social Security number, the addressee and the length of time the copies of the mail contents are to be stored. After the multipart receipt is completed, the postal employee gives the original of the multipart receipt to the postal customer; and places the mail contents and the remaining parts of the multipart receipt into a special internal mailer to be sent to the verification department of the sectional center servicing that particular post office. When a special internal mailer reaches a sectional center, either from an outlying post office or directly from an individual using the Verified Mail service window at the sectional center, a postal employee in charge of verifying mail could copy by microfilm or equivalent means the front and back of each enclosure after affixing an appropriate tab indicia to each sheet to identify that sheet for retrieval purposes. After the copying is completed, the postal employee inserts the mail contents into a special Verified Mail envelope to which is affixed an address label, which in one embodiment, can be a part of the multipart receipt and which discloses only the addressee and the sender. The special Verified Mail envelope is then sealed and mailed. This envelope may be sent by certified mail or registered mail.

In another embodiment, the postal customer could reeive a temporary identification number on his receipt and could be notified by mail of his permanent identification number after the documents had been copied at the sectional center.

While the contents to be verified may be copied by many means, there are substantial advantages to using a microfilm recording system in that documents, once microfilmed, are easily stored and later, easily retrieved. Microfilm cameras can be locked and sealed to prevent unauthorized viewing of the copied documents and confidentiality can be preserved. The microfilm of the copied documents must have an identification number on each frame containing a document so copied to assist in its retrieval at a later date from a Central Depository where the verified mail copies are stored. A postal customer can pay a set fee for the time period he wishes to have the verified mail contents stored and verified documents whose storage time has expired can be destroyed. In one embodiment, the postal customer can have the option of being notified prior to the date when his verified documents are scheduled to be destroyed so that he may extend the storage time if he wishes. Storage volume can be thus kept to a minimum. In one embodiment it is anticipated that as part of the storage process the microfilm can be copied from reels received from each sectional center onto larger reels having means for retrieval of individual identification frame numbers and each larger reel having the same time expiration date so that the documents on that reel can be conveniently destroyed when the expiration date is reached.

To assure a secure system of document recording, a microfilm cameral utilizing a two-camera or dual system of photographing can be used. If one copy should by chance be damaged, the second copy could still remain as a permanent record.

In one embodiment of the retrieval system of this invention, when a postal customer wishes to receive a verified copy, he takes his receipt to his local post office. At the Verified Mail service window he fills out a multipart Verified Mail order form or equivalent means for ordering verified copies stating his name, address, Social Security number, identification frame numbers and signs his name on the form. He then pays for the number of verified copies he wishes to order. The customer retains his original receipt and also one part of the multipart Verified Mail order form. The order form is then sent to the Central Depository for processing. When an order form is received by the Central Depository, a postal employee having a notary or other certification authority compares the signature on the order form with the signature appearing on the tab indicia on the microfilm. If satisfied that the two signatures were made by the same individual, the postal employee places the microfilm storage reel containing the identification frame numbers requested into a microfilm reader/printer and prints copies of the microfilm frames possessing the identification frame numbers requested onto an unalterable medium. The postal employee then notarizes that each copy is a true and accurate copy of what was on the microfilm and, in one embodiment of this invention, may emboss a seal directly into the copies. The verified copies can then be mailed by registered, certified or verified mail to the postal customer requesting the verified copies.

The apparatus, means and method of the present invention will become clearer by reference to the following drawings and Description of the Preferred Embodiment.

DESCRIPTION OF THE PREFERRED EMBODIMENT

Figure 1:
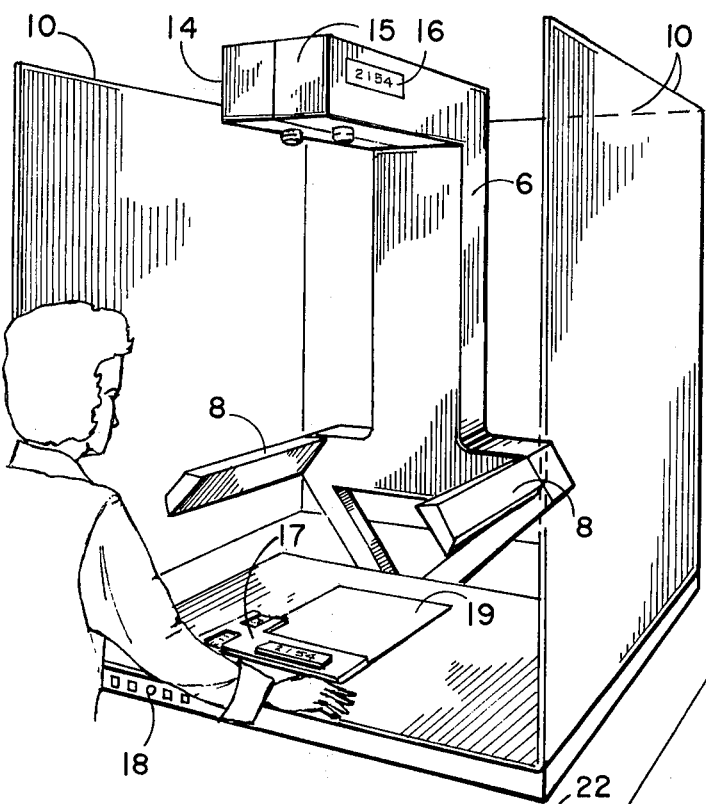
FIG. 1 illustrates a typical dual microfilm system with side members in place.

FIG. 1 illustrates typical microfilm camera unit 6 with lights 8, side members 10 in place to assure the confidentiality of the documents being copied by preventing others from viewing these documents as they are being copied. The microfilm camera unit depicted is one of the dual camera type which utilizes two microfilm cameras 14 and 15 positioned side by side. In one embodiment of this invention it is anticipated that each frame of the microfilm will be prenumbered with consecutive numbers so that there will be no duplication of any individual number on any other roll of microfilm. Associated with each prenumbered roll of microfilm will be a prenumbered pad containing the same consecutive numbers. Microfilm camera unit 6 has window 16 on its body to display the number of the film frame that is about to be taken so that it can be compared with the number on the paper pad held on tab indicia plate 17. Tab indicia plate 17 and document 19 to be copied are shown in position to be photographed. It is anticipated that these specially numbered microfilm rolls will be treated with security precautions and will be sold only to the Post Office. These microfilm rolls, prior to and after exposure, can be stored in a Central Depository which is intended to be a limited access facility. The microfilm camera unit as illustrated can be easily operated by individuals with a minimum of training. Controls 18 on the unit are located in an easily accessible place. The exposure is self-correcting and the lights operate only when an exposure is made. Also, microfilm cameras can indicate when their microfilm supply is running low. Although no system may be considered foolproof, error-checking features have been incorporated within the system of this invention to minimize the incidence of error.

Figure 2:
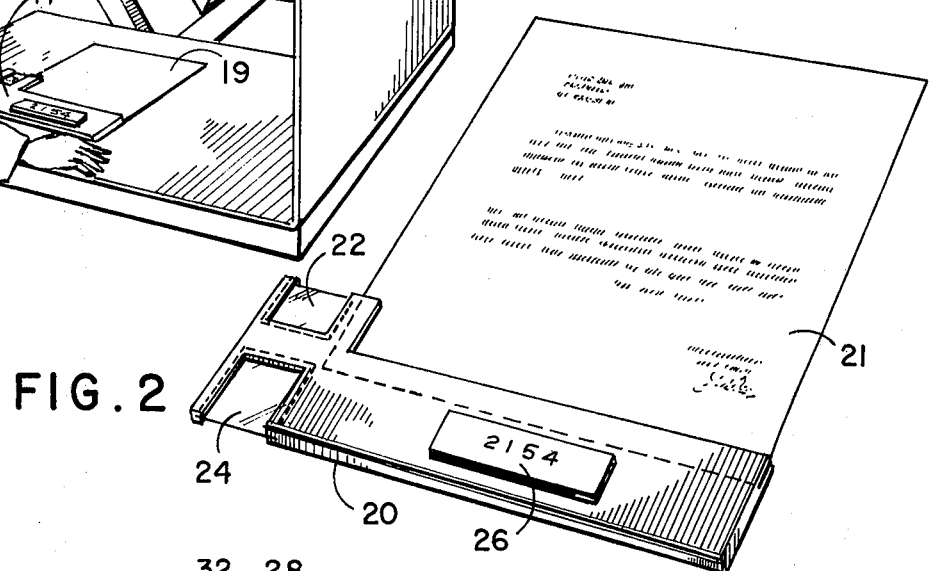
FIG. 2 illustrates a typical tab indicia plate with number pad and document to be copied in place thereon.

FIG. 2 illustrates one embodiment of tab indicia plate 20 capable of fitting onto the corner of document 21 to be photographed. Receptacle 22 receives the Post Office's copy of the multipart receipt which can indicate the sender's name, address, telephone number, Social Security number, addressee, signature of the sender, length of storage time, and any other pertinent information. In compartment 24 of the tab indicia plate can be inserted the identification of the postal employee operating the microfilm camera unit and any other internal information desired by the Post Office. Pad 26 contains sequentially-numbered paper sheets whose numbers correspond exactly with the frame numbers of the microfilm frames being utilized in the dual camera unit at the time that a document is inserted into the tab indicia plate. For example, when the dual camera unit is about to shoot microfilm frame number 2154 as shown in window 16 of FIG. 1, the pad of paper will have exposed a sheet bearing number 2154. After the document has been photographed, the postal employee tears off the top sheet of the pad, thereby exposing the next number, 2155. The dual camera unit is then ready to shoot microfilm frame 2155. It is anticipated that both the front and back of a document will be photographed even though the back of a document may be blank as this procedure will eliminate later questions as to whether writing existed on the back of a document.

Figure 3:
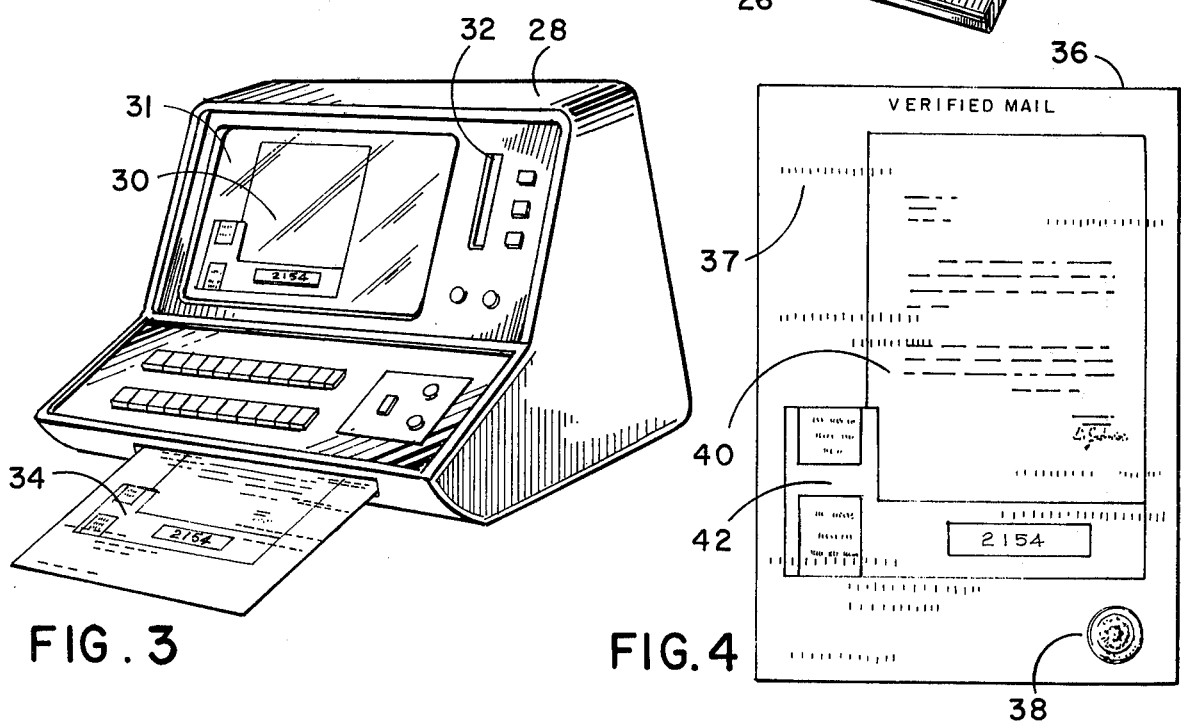
FIG. 3 illustrates a typical microfilm reader/printer for retrieval of documents requiring verification.

FIG. 3 illustrate typical microfilm printer/reader 28 which in one embodiment could be located at the Central Depository and utilized to reproduce verified copies of documents that have been ordered by postal customers. To order verified copies, an individual fills out a verified mail order form at his local post office which form he must sign. When the order form is received at the Central Depository, the signature appearing on the order form is compared with the signature on the microfilm frames requested. If there are any discrepancies, the postal employee will inquire further as to that individual's right to receive copies of the mail contents on file. Other checks may be incorporated into the system of this invention to prevent abuse of the system. Reader/printer 28 has screen 31 for viewing the image 30 of the document on microfilm and prints a copy of this image from microfilm reel 32. Copy 34 is shown emerging from the printer/reader.

Figure 4:
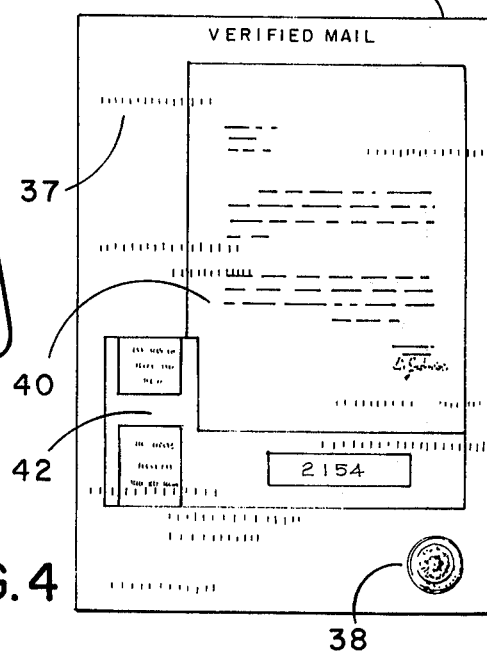
FIG. 4 illustrates a typical verified document, its indicia and seal of the Post Office as to the documents authenticity.

FIG. 4 illustrates typical verified copy 36 with document 40 and tab indicia plate 42 printed thereon and shows, in one embodiment of this invention, official embossed seal 38 of the Post Office. This embossed seal amounts to verification by the Post Office that the copy is an exact duplicate of the document mailed by the original sender. Such embossing may be done by equipment such as that used in the preparation of passports or in an equivalent manner that cannot be altered. In one embodiment of this invention, the verified copy can be printed on an unalterable medium such as safety paper 37 or equivalent which could assist in detecting alterations made to the verified copy.

I claim:

1. A method for the verification of mail contents comprising:
   receiving of mail contents by a postal employee from a postal customer;
   filling out a multipart receipt for said mail contents by said postal employee;
   retaining of one part of said multipart receipt by said postal customer for his records;
   retaining by said postal employee of the remaining parts of said multipart receipt for Post Office use;
   placing one part of said multipart receipt into a tab indicia plate which is placed at the corner of said mail contents to be copied;
   copying said mail contents with said tab indicia plate containing said multipart receipt at its corner;

sending said copies of said mail contents to a Central Depository for storage;

retrieving said stored copies at the request of said postal customer;

reproducing copies of said mail contents;

verifying that said copies are true copies of the mail contents originally received by the Post Office from said postal customer; and mailing said verified copies to said postal customer.

2. A method as described in claim 1 wherein the copying of said mail contents is performed by a microfilm camera apparatus.

3. A method as described in claim 2 wherein said microfilm copies are stored in a Central Depository and the retrieval and reproduction of said copies is accomplished by printing the microfilm on a printable medium.

4. A method as described in claim 3 wherein said printable surface is unalterable and is embossed with an official imprint to denote that said copies are true copies.

5. A mail verification system comprising:

a multipart receipt one part of which acts as the postal customer's proof of receipt of the mail contents to be verified by the Post Office and another part of which is used by the Post Office as means for identifying said postal customer whose mail contents are to be verified;

a tab indicia plate having compartments for receiving said Post Office's identification part of said multipart receipt and for receiving a postal employee identification slip of the postal employee making copies of said mail contents, and further including a section for insertion of means for identifying the individual copies made of said mail contents, said tab indicia plate to be placed at the corner of said mail contents to be copied;

a microfilm camera apparatus for photographing said mail contents and tab indicia plate;

a Central Depository for storage of the microfilm copies of said mail contents;

a multipart order form filled out by said postal customer for requesting verified copies of said mail contents originally submitted to the Post Office by said postal customer;

a microfilm reader/printer apparatus for printing copies of said mail contents;

an unalterable printable medium on which said copies are printed; and an embossing device for embossing the Post Office's imprint of authentication on said copies verifying that said copies are true copies of said mail contents originally received by the Post Office from said postal customer.

* * * * *